Jan. 16, 1934.  P. J. McMANAMAN  1,943,833
AUTOMOBILE SIGNAL
Filed Nov. 3, 1931
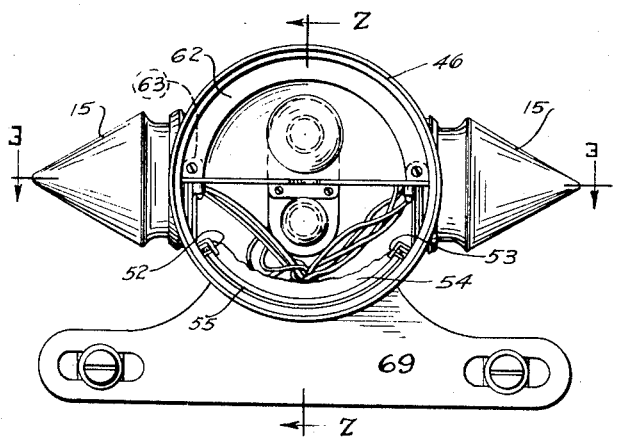
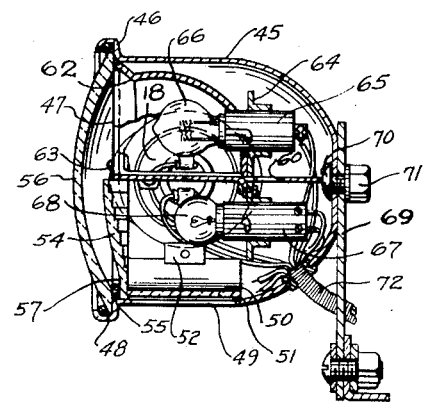
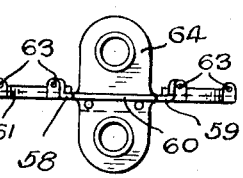
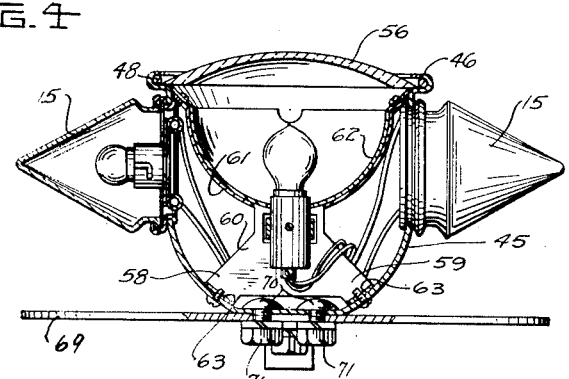
INVENTOR
PATRICK J. McMANAMAN
BY
John A. Bommhardt
ATTORNEY Patented Jan. 16, 1934

1,943,833

UNITED STATES PATENT OFFICE 1,943,833

AUTOMOBILE SIGNAL

Patrick J. McManaman, Cleveland, Ohio

Application November 3, 1931. Serial No. 572,779

1 Claim. (Cl. 240—8.3)

This invention relates to improvements in automobile signals, and particularly to a combined backing and tail light structure.

The object of the invention is to improve the construction of such signal lamps, and it is characterized particularly by improved means for supporting backing and tail lamps in a single casing provided with two chambers each containing one of the lamps, the casing having a large clear lens enclosing both lamps, and a single semi-circular colored lens cooperating with one lamp only, the lenses being supported in place by improved devices.

One form of the invention is illustrated in the accompanying drawing in which Fig. 1 is an elevation of the lamp unit. Fig. 2 is a section on the line 2—2 of Fig. 1. Fig. 3 is a section on the line 3—3 of Fig. 1. Fig. 4 is an elevation of a double lamp bracket and partition.

The rear signal lamp consists of a casing 45 with a flanged ring 46 forming an aperture 47 into which a lens 56 is fitted and held in position by means of a wire spring 48. Aperture 49 in the base of the casing 45 is covered with a clear lens 50 fitted on the inside of the casing 45 over a gasket 51 which fits around the outside of the aperture 49. The gasket and lens are held in position by a pair of angular brackets 52 and 53 attached to the inner walls of the casing 45. Immediately forward of the front edge of the lens 50 is a third lens 54 which is of red glass semi-circular in shape, being cut straight across the top which is approximately in the center of the aperture 47, and the inner surface of the said lens 54 is corrugated as shown in Fig. 2. A gasket 55 fits between the flange 57 of the inner lens 54 and the inner surface of the outer lens 56.

Attached to the inner surface of the back wall of the casing 45 by a pair of angular legs 58 and 59, is a middle plate or bracket 60 with a circular flange 61 which forms a supporting band to which the reflector 62 is attached by means of a plurality of upstanding lugs 63 to which the reflector is bolted. Mounted in the center of the 60 bracket 60 is a double lamp bracket 64, the upper socket 65 holding the backing-up lamp 66 while the lower socket 67 holds the tail light 68.

The casing 45 is attached to a license plate bracket 69 by means of bolts and nuts 70 and 71 respectively. A wire cable 72 retains the wires on the outside of the casing.

The casing is also provided with glass arrow heads 15 at opposite sides, illuminated by lamps therein according to right and left turns, but forming no part of the present invention.

With the structure shown the tail lamp 68 shines through the red lens 54 for the usual tail light. When backing, the lamp 66 is lighted by suitable circuit connections, and illuminates the outer lens 56, indicating a different signal for the intended purpose.

I claim:

A combined backing and tail light comprising a casing having an opening and a single clear lens covering the opening, a partition extending across the casing and forming upper and lower chambers behind the clear lens, a lamp in each chamber, supported by the partition, and an inner semi-circular colored light concentrating lens between the lower lamp and the clear lens, said inner lens having its flat edge adjacent the partition and having the same shape as the opening for the lower chamber, with the lower curved edge held in position by the edge of the clear lens, so as to close said chamber and form a tail light.

PATRICK J. McMANAMAN.